United States Patent [19]

Pelleboer

[11] Patent Number: 4,697,787
[45] Date of Patent: Oct. 6, 1987

[54] BALL VALVE MADE ENTIRELY OF PLASTICS MATERIAL

[75] Inventor: Nicolaas Pelleboer, Olst, Netherlands

[73] Assignee: Nederlandse Industriele Maatschappij Nefit B.V., Deventer, Netherlands

[21] Appl. No.: 809,902

[22] Filed: Dec. 17, 1985

[30] Foreign Application Priority Data

Dec. 17, 1984 [NL] Netherlands ............... 8403825

[51] Int. Cl.$^4$ ............................................. F16K 5/06
[52] U.S. Cl. ................................... 251/315; 251/151; 137/454.2
[58] Field of Search ............... 251/148, 151, 171, 192, 251/312, 315, 904; 137/454.2

[56] References Cited

U.S. PATENT DOCUMENTS

| 221,288 | 11/1879 | Dewrance | 251/171 |
|---|---|---|---|
| 1,381,873 | 6/1921 | Hardy | 251/312 |
| 2,741,452 | 4/1956 | Benjamin | 251/192 |
| 3,323,542 | 6/1967 | Magos et al. | 251/151 |
| 3,339,887 | 9/1967 | Hutchens | 251/315 |
| 3,529,621 | 9/1970 | Christiansen | 251/312 |
| 3,732,885 | 5/1973 | Allen | 251/148 |
| 4,022,427 | 5/1977 | Read | 251/171 |
| 4,023,773 | 5/1977 | Wise | 251/148 |
| 4,099,705 | 7/1978 | Runyan | 251/315 |
| 4,146,055 | 3/1979 | Ryder et al. | 251/904 |
| 4,147,184 | 4/1979 | Jess | 251/312 |
| 4,277,046 | 7/1981 | Cavileer | 251/312 |
| 4,372,529 | 2/1983 | Kato | 251/151 |
| 4,465,092 | 8/1984 | Vitale | 251/148 |
| 4,511,120 | 4/1985 | Conley et al. | 251/312 |
| 4,523,740 | 6/1985 | Paitchell | 251/315 |
| 4,553,562 | 11/1985 | Nakada | 251/315 |
| 4,617,957 | 10/1986 | Sandling | 251/312 |

Primary Examiner—A. Michael Chambers
Assistant Examiner—John C. Fox
Attorney, Agent, or Firm—Edmund M. Jaskiewicz

[57] ABSTRACT

A ball valve made entirely of plastics material comprising a tubular casing with connection pieces which are fastened to both its ends and which together form a through passage for a medium, a ball disposed in the through passage inside the casing and provided with a through opening, operating means formed by a spindle inserted into an opening in the casing, cooperating with the ball, and provided with an operating grip to enable the ball to be turned so as to close or open the through passage. The casing consists of a substantially cylindrical outer casing to each end of which the connection pieces are welded, and of an inner casing disposed therein. The inner casing being constructed of two parts each of which having a seat. Both parts are connected by means of a screwthread and enclose the ball in between them. The inner casing at each end being provided with an external cylindrical surface projecting out of the outer casing each of said surface cooperating with an internal cylindrical surface on the two connection pieces to form a guide for these connection pieces.

11 Claims, 10 Drawing Figures

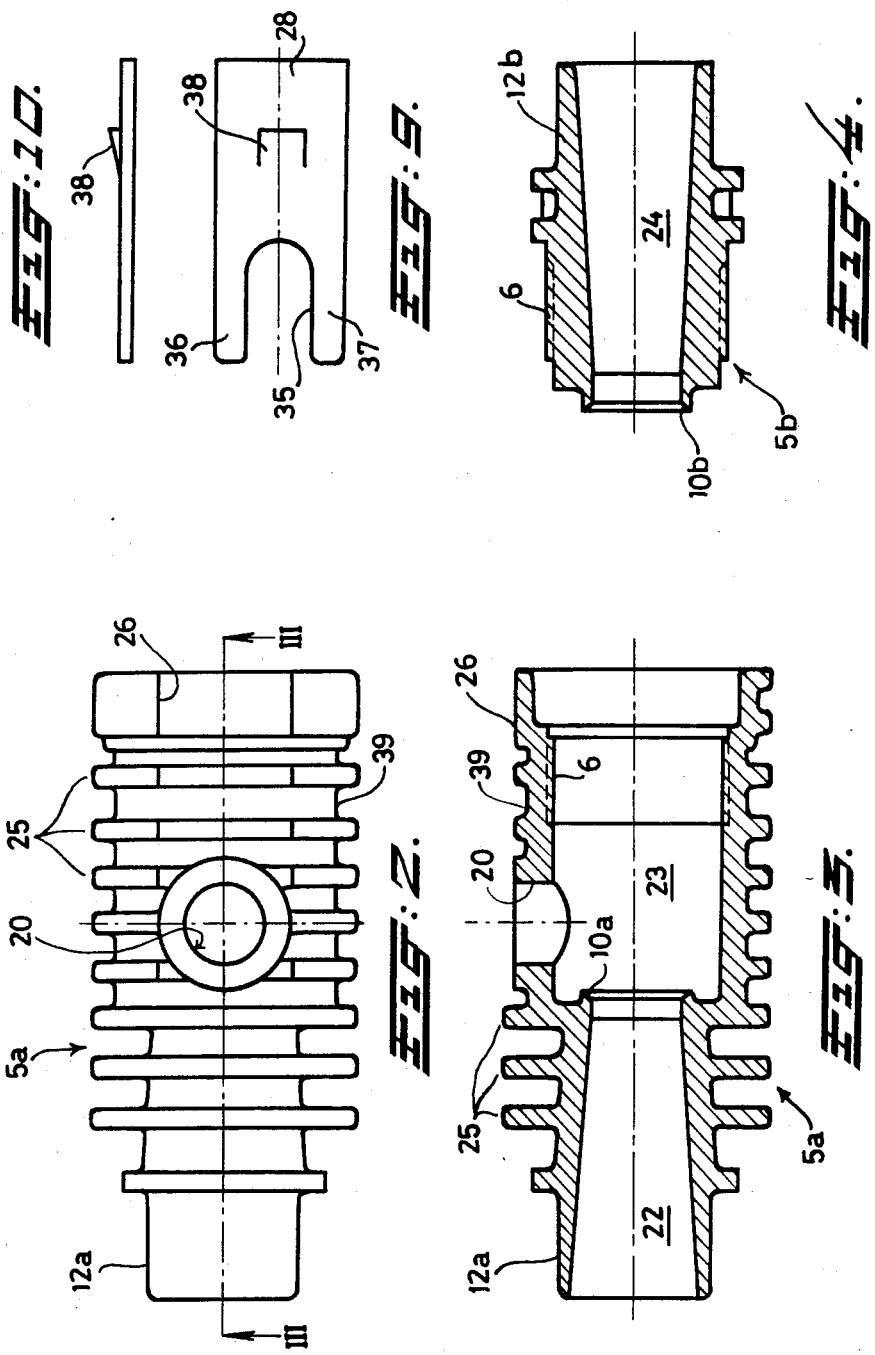

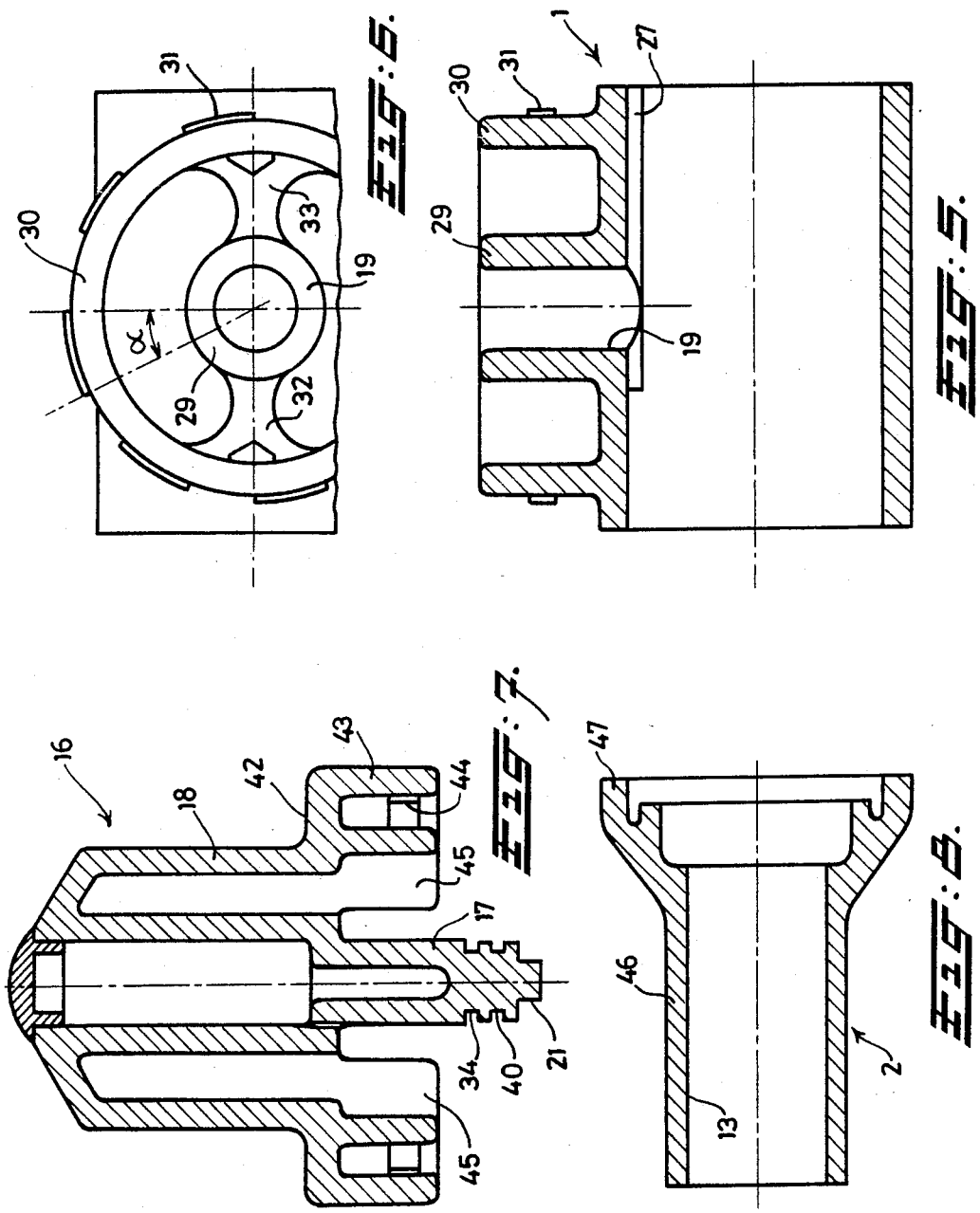

BALL VALVE MADE ENTIRELY OF PLASTICS MATERIAL

BACKGROUND OF THE INVENTION

The present invention relates to a ball valve which is made entirely of plastics material and comprises a tubular casing with connection pieces which are fastened to both its ends and which together form a through passage for a medium, a ball disposed in the through passage inside the casing and provided with a through opening, an operating means formed by a spindle inserted into an opening in the casing, cooperating with the ball, and provided with an operating grip to enable the ball to be turned so as to close or open the through passage.

Ball valves of this kind are intended to be installed in underground polyehtylene pipes, and must on the one hand function reliably and on the other hand be resistant to the penetration of dirt and moisture.

In known valves of this kind each of the connection pipes is usually provided with a seat for the valve and is fastened to the casing by butt welding. When the butt weld is made, the seats are axially displaced and moved towards one another. The problem thus arising is that the axial displacement during the butt welding must be such that on completion of the welding the ball is correctly enclosed between the seats. This procedure requires on the one hand accurate dimensioning and machining of the component parts which are to be welded together, and on the other hand a very accurately conducted welding process. In addition, changes may be caused by thermal expansion and contraction, so that the ball will no longer be enclosed under the correct pressure between the seats.

SUMMARY OF THE INVENTION

The present invention seeks to provide a ball valve which is entirely made of plastics material and which complies with requirements for underground installation, while the abovementioned disadvantages are avoided.

A further object of the invention is to provide a ball valve which is economical to produce and has the smallest possible number of components, and in which these components can be assembled in a simple manner.

According to the invention these aims are achieved in that the casing consists of a substantially cylindrical outer casing to each end of which the connection pieces are welded, and of an inner casing which is disposed therein and is constructed of two parts, each of which has a seat and which enclose the ball between them, the inner casing being provided at each end with an external cylindrical surface projecting out of the outer casing, each such surface cooperating with an internal cylindrical surface on the two connection pieces in order to form a guide for these connection pieces.

For preference the two parts of the inner casing are joined together by screwthreads and are each provided with an external cylindrical guide surface for the connection pieces.

Since the ball is enclosed between the two parts of the inner casing, which are joined together by screwthreads, the pressure under which the ball is enclosed can be adjusted accurately. During the welding of the connection pieces to the outer casing, the connection pieces can be displaced in the axial direction, relative to the inner casing, over the guide surfaces of the inner casing, so that a good, reliable weld can be made without affecting the installation of the ball.

The inner casing is preferably fastened relative to the outer casing with the aid of the spindle of the operating means, this spindle being provided with a neck in the region lying, in the installed position, at the boundary between the outer and inner casings, while a space is left free between the inner and outer casings in the region where the spindle of the operating means passes into the casing, so that a retaining plate can be inserted between the inner and outer casings, this retaining plate engaging in the neck of the spindle in order to secure the latter in the axial direction.

In this way the valve according to the invention can be installed in a simple manner because, once the ball is enclosed between the two parts of the inner casing, this inner casing is placed in the outer casing, the spindle of the operating means is then pushed inwards from the outer periphery of the outer casing until it engages in the ball, the spindle then being fastened by means of the retaining plate. The two connection pieces can thereupon be welded to the outer casing.

In a preferred embodiment of the invention an annular ridge is formed around the opening in the casing through which the spindle of the operating means is passed, thus forming a guide for this spindle, and a second annular ridge is formed concentrically to and at a distance from this guide ridge, the outer surface of this second ridge cooperating with an internal surface, in contact with it, of the operating grip forming an integral part of the spindle.

Since the spindle is installed by being pushed from the outer periphery of the casing inwards into the ball, it is possible for the operating grip and the spindle to be made in one piece, for example by injection moulding. In this case the operating grip is provided at its bottom edge with a widened portion having an internal cylindrical surface cooperating with an external cylindrical surface of the second ridge. These surfaces, which lie one against the other, on the one hand prevent dirt or moisture from penetrating into the interior, while on the other hand, if these surfaces are provided with suitable toothing, it is possible to increase to a determined value the torque for the operation of the valve, so that accidental opening and/or closing of the valve is avoided.

SURVEY OF THE DRAWINGS

FIG. 2 is a top plan view of a part of the inner casing;

FIG. 3 is a section on the line III—III in FIG. 2;

FIG. 4 is a longitudinal section of the screw-in member of the inner casing;

FIG. 5 is a vertical longitudinal section of the outer casing;

FIG. 6 is a partial top plan view of the outer casing shown in FIG. 5;

FIG. 7 is a vertical section of the operating means;

FIG. 8 is a longitudinal section of one of the connection pieces;

FIG. 9 is a top plan view of the retaining plate; and

FIG. 10 is a side view of the retaining plate shown in FIG. 9.

DESCRIPTION OF THE PREFERRED EMBODIMENTS

Figure 1:
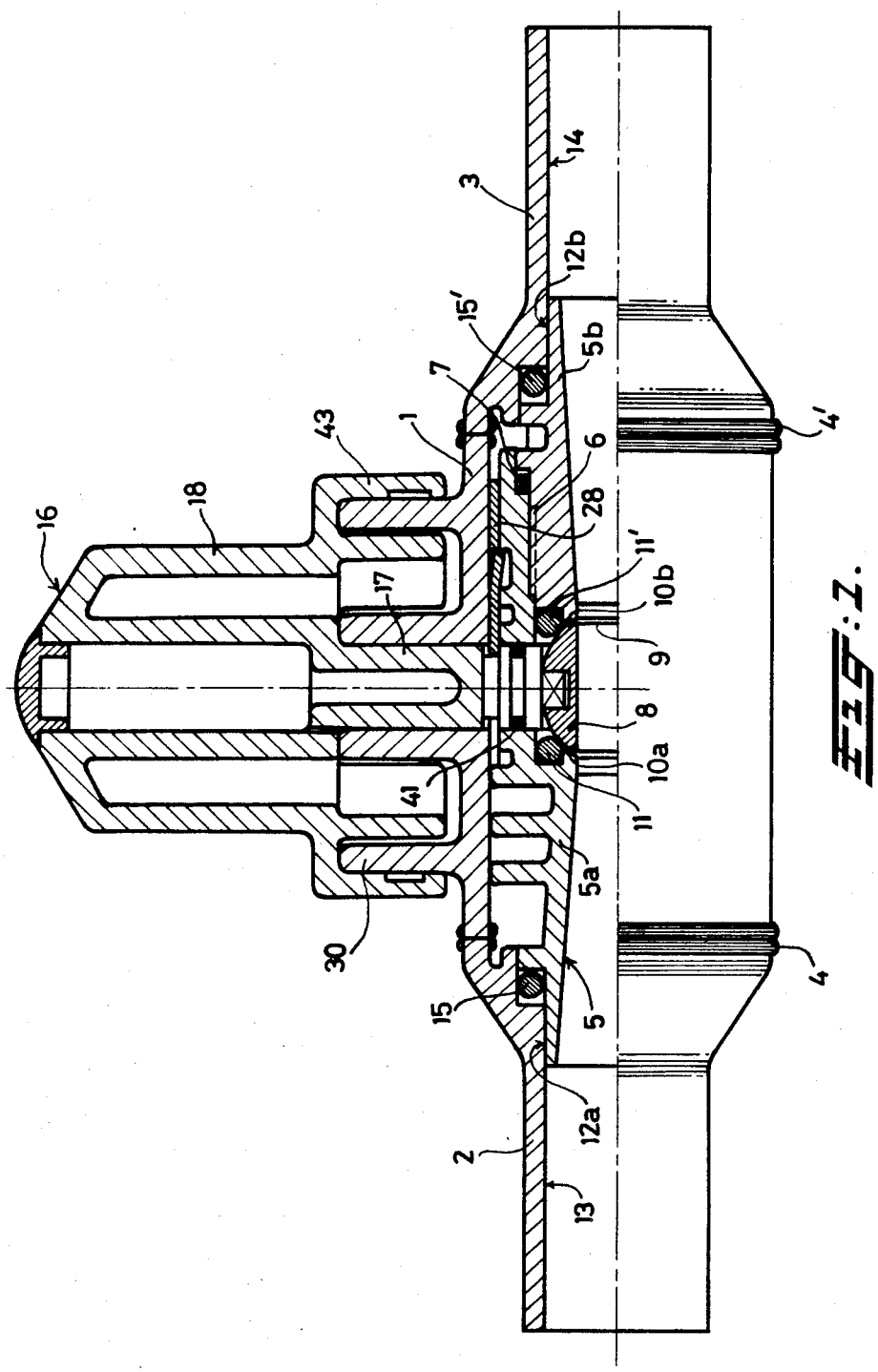
FIG. 1 shows, partly in vertical longitudinal section, the ball valve according to the invention.

As can be seen in FIG. 1, the ball valve according to the invention consists of a tubular outer casing 1, to each end of which a connection piece 2, 3 is welded by a butt weld 4, 4'. Inside the outer casing 1 is disposed an inner casing 5 consisting of a first part 5a and a screw-in member 5b which can be screwed in the first part by means of a screwthread 6. The two parts of the inner casing are sealed relative to one another by means of an O-ring 7. Between the two parts of the inner casing is enclosed a ball 8, which is provided with a through opening 9. The ball 8 is enclosed between seats 10a and 10b and is sealed in relation to the inner casing by means of O-rings 11, 11'.

In the installed position the inner casing projects out of the outer casing on both sides, and at each end is provided with an external cylindrical surface 12a and 12b respectively. These surfaces cooperate with internal cylindrical surfaces 13 and 14 respectively on the connection pieces 2 and 3, the surfaces being sealed relative to one another by means of O-rings 15, 15'.

The ball 8 enclosed in the casing 5 can be turned with the aid of an operating means 16 consisting of a spindle 17 and an operating grip 18. The spindle 17 extends through an opening 19 in the outer casing and an opening 20, in alignment therewith, in the inner casing, and at its end has a projection 21 of rectangular cross-section engaging in a correspondingly shaped recess in the ball (see FIG. 7).

As can be seen in particular in FIGS. 2 and 3, the first part 5a of the inner casing 5 is mainly in the form of a hollow cylinder, this inner casing being adapted to fit into the outer casing. The internal passage in the part 5a consists of a first slightly convergent inlet portion 22 which leads via the seat 10a into a chamber 23 for the ball. The chamber 23 is provided at the end opposite the seat 10a with a screwthread 6 enabling the screw-in member 5b shown in FIG. 4 to be screwed into it. The screw-in member 5b is provided with a passage 24 which is slightly divergent from the seat 10b. In the assembled state the inner casing, together with the ball 8 placed in the chamber 23, has a passage 22, 9, 24 for the medium. As can be clearly seen in FIG. 1, this passage is directly connected to the interior of the respective connection pieces 2 and 3.

As can be clearly seen in FIG. 2, the outer periphery of the part 5a is provided with a number of ribs 25 which extend around it and which are regularly spaced apart. These ribs ensure a light construction and uniform thickness of the wall of the inner casing.

In the chamber 23 is provided the opening 20 through which the spindle 17 of the operating means 16 can be passed in order to turn the ball 8. In the region of the opening 20 the outer surface of the part 5a is provided with a flat surface 26, the purpose of which will be explained later on.

The substantially tubular outer casing 1 shown in FIGS. 5 and 6 is provided with the opening 19, which in the assembled state of the valve lines up with the opening 20 in the part 5a of the inner casing. The interior surface of the outer casing is provided in the region of the opening 19 with a recess 27, which in the assembled state leaves free, in conjunction with the flat surface 26 of the inner casing, a space into which a retaining plate 28 can be inserted, this retaining plate being shown in FIGS. 9 and 10. Around the opening 19 is provided on the outer periphery of the outer casing an annular ridge 29 which serves to guide the spindle 17 of the operating means 16. Some distance from the ridge 29 a second annular ridge 30, concentric thereto, is disposed and is provided on its outer periphery with regularly spaced teeth 31. In addition, stiffening ribs 32, 33 are disposed between the ridges 29 and 30.

The operating means 16 shown in FIG. 7 is in the form of an integral injection moulding consisting of the spindle 17 and the operating grip 18. The spindle 17 is provided with a neck 34, which in the assembled state of the operating means is situated in the free space which, as described above, is formed by the flat surface 26 of the inner casing and the recess 27 in the outer casing. The retaining plate 28 is provided at one end with an open slot 35, the width of which corresponds approximately to the diameter of the neck 34 of the spindle 17. The retaining plate inserted into the space 26, 27 can thus engage by means of lips 36, 37 lying one on each side of the slot 35 in the neck 34 of spindle 17, so that the spindle can be secured in the axial direction. The retaining plate 28 is in addition provided with a spring lip or boss 38 which, as illustrated in FIG. 1, forms a snap connection with a cavity 39 formed between two adjoining ribs 25 in the flat surface 26 of the inner casing. Beneath the neck 34 the spindle 17 is provided with a second neck 40, which serves to receive an O-ring 41 effecting the sealing between the spindle 17 and the part 5a of the inner casing.

The operating grip 18 of the operating means 16 has a square cross-section, so that a tool can easily act on it to operate the valve. The grip 18 merges near its lower face, via a horizontal portion 42, into a cylindrical wall 43. The inside diameter of the wall 43 corresponds approximately to the outside diameter of the ridge 30, while the inside of the wall 43 is provided with teeth 44 adapted to cooperate with the teeth 31 on the ridge 30. The teeth 44 and 31 are so shaped that both in the completely opened position and in the closed position, after turning 90°, they interengage without causing stresses in the wall 43. In the embodiment illustrated the teeth are rectangular and extend over an arc length having an angular distance $\alpha = 22.5°$. The teeth serve to ensure a determined minimum torque for the turning of the operating means. It is desirable that the minimum torque during the turning of the operating means should be constant. In order to achieve this, the number and the shape of the teeth can be modified, provided that it is ensured that in the closed and open positions the teeth fully interengage. In other words, the quotient $90°:\alpha$ should give a whole even number.

Inside the wall 43 are disposed a number of projections 45, 45' which in conjunction with the ribs 32 and 33 permit the turning of the operating means over an angle of 90°. During the turning of the operating means the teeth 44 run over the teeth 31, so that stresses are produced in the wall 43. In the two end positions of the operating means the teet engage fully in one another and the wall 43 is free of stress. Since the wall 43 lies against the ridge 30, appropriate sealing is likewise achieved between the operating grip and the outer casing, so that no dirt and/or moisture can penetrate to the inside.

The two connection pieces are of identical construction, so that it will be sufficient to describe the connection piece 2 shown in FIG. 8. This connection piece consists of a tubular portion 46 which at one end widens into a cylindrical wall 47 whose circumference measurements coincide with those of the ends of the outer casing 1. The interior surface 13 of the tubular portion 46 has approximately the same diameter as the outside cylindrical surface 12a of the part 5a of the inner casing 5. For the assembly of the valve the connection piece can thus be pushed into the inner casing which is already installed in the outer casing, whereby the connection piece is fixed in the radial direction. In this way the connection piece can be fastened by butt welding to the outer casing.

For the butt welding, the surfaces which are to be welded together are first heated and then pressed against one another with a determined pressure. During this welding there is thus an axial displacement of the connection piece in relation to the inner casing. The construction according to the invention makes this displacement possible without affecting the action of the valve, so that a good, reliable weld can always be achieved.

In order to make a good weld possible, the connection piece and the outer casing are made of the same material as the pipe in which the valve is to be inserted, that is to say polyehtylene. The other components of the valve, such as the operating means, the inner casing, the ball and the retaining plate, are preferably made of a higher grade material, such as technical plastics.

To sum up, according to the invention a ball valve is provided which consists of relatively few components and is easily assembled since on the one hand the ball is entirely enclosed in the inner casing and on the other hand the operating means can be inserted into the casing from the outer periphery and can be fastened in a simple manner by the retaining plate. In addition, it is possible for the connection pieces to be welded in a reliable manner without affecting the working of the valve.

It will also be clear that within the scope of the present application a large number of modifications are possible. Thus, the other casing may be in the form of an integral injection moulding incorporating one of the connection pieces, so that after the installation of the inner casing and the operating means it will only be necessary to fasten the other connection piece by butt welding.

The retaining plate 28 may also have a tubular shape, in which case the outer surface of the part 5a (in FIG. 3 at the right) has a smaller diameter in order to let free an annular space in between the inner and outer casing for inserting said tubular retaining plate.

What is claimed is:

1. Ball valve made entirely of plastics material, comprising a tubular casing and a pair of connection pieces which are fastened to both its ends and which together form a through passage for a medium, a ball disposed in the through passage inside the casing and provided with a through opening, an operating means comprising a spindle inserted into an opening in the casing, cooperating with the ball, and having an operating grip to enable the ball to be turned so as to close or open the through passage, said casing comprising a substantially cylindrical outer casing to each end of which the connection pieces are welded, and an inner casing which is disposed within said outer casing and is constructed of two parts connected together each part having a seat and which enclose the ball between them, the inner casing being provided at each end with an external cylindrical surface projecting axially out of the outer casing, and such external cylindrical surface slidably cooperating with an internal cylindrical surface on the two connection pieces to define a guide for axial displacement of said connection pieces relative to said inner casing.

2. Ball valve according to claim 1, wherein the two parts of the inner casing are joined together by means of a screwthread, and each is provided with an external cylindrical guide surface for the connection pieces.

3. Ball valve according to claim 1, wherein the inner casing is fastened in relation to the outer casing by means of the spindle of the operating means.

4. Ball valve according to claim 3, wherein the spindle of the operating means is provided with a neck in the region which in the assembled state is situated on the boundary between the outer and the inner casings, while a space is left free between the inner and outer casings in the region where the spindle of the operating means is inserted into said casings, so that a retaining plate can be inserted between the inner and outer casings, this retaining plate engaging in the neck of the spindle in order to fasten the spindle in the axial direction.

5. Ball valve according to claim 4, wherein in the assembled state the retaining plate is fastened by means of a snap connection.

6. Ball valve according to claim 1, wherein the inner casing is provided on the outer periphery with a number of parallel annular ribs spaced apart from one another.

7. Ball valve according to claim 1, wherein around the opening in the outer casing through which the spindle of the operating means is inserted an annular ridge is provided which forms a guide for the spindle, and that concentrically and at a distance from this ridge a second annular ridge is provided whose outer surface cooperates with an internal surface, in contact therewith, of the operating grip integral with the spindle.

8. Ball valve according to claim 7, wherein the outer surface of the second ridge is provided with toothing, while the inner surface, cooperating therewith, of the operating grip is provided with teeth of complementary shape in order to increase the torque for turning the operating grip.

9. Ball valve according to claim 8, wherein the toothing is rectangular and each tooth extends over an arc length with an angular distance, the quotient 90°:α giving a whole even number.

10. Ball valve according to claim 9, wherein the toothings interengage both in the closed and in the entirely open position of the valve.

11. Ball valve according to claim 1, wherein the connection pieces and the outer casing are made of polyethylene and the ball, the inner casing, and the operating means are made of technical plastics.

* * * * *